(12) United States Patent
Edwards et al.

(10) Patent No.: US 8,453,592 B2
(45) Date of Patent: Jun. 4, 2013

(54) ANIMAL FEEDING REMINDER SYSTEM

(76) Inventors: Timothy Edwards, Del Mar, CA (US); Shaun Edwards, Del Mar, CA (US)

(*) Notice: Subject to any disclaimer, the term of this patent is extended or adjusted under 35 U.S.C. 154(b) by 67 days.

(21) Appl. No.: 13/052,675

(22) Filed: Mar. 21, 2011

(65) Prior Publication Data

US 2012/0240862 A1    Sep. 27, 2012

(51) Int. Cl.
*A01K 5/00* (2006.01)
*A47J 43/28* (2006.01)

(52) U.S. Cl.
USPC ............. 116/308; 116/307; 30/326; 222/192

(58) Field of Classification Search
USPC ........ 116/306, 307, 308; 206/459.1; 222/191, 222/192; 30/324, 326
See application file for complete search history.

(56) References Cited

U.S. PATENT DOCUMENTS

| | | | | |
|---|---|---|---|---|
| 201,369 A * | 3/1878 | Walker | ............................. | 30/123 |
| 1,619,878 A * | 3/1927 | Morgan et al. | .................. | 30/123 |
| 2,833,064 A * | 5/1958 | Parker | ............................. | 40/312 |
| 2,833,068 A * | 5/1958 | Parker | ............................. | 40/113 |
| 3,818,858 A * | 6/1974 | Kramer et al. | ................. | 116/308 |
| 3,853,090 A * | 12/1974 | Watson et al. | ................. | 116/308 |
| 4,466,150 A * | 8/1984 | Jurt | ............................. | 15/143.1 |
| 4,621,670 A * | 11/1986 | Yuen | ............................. | 220/801 |
| 4,877,119 A * | 10/1989 | Hosking | .................... | 206/459.1 |
| 4,981,106 A | 1/1991 | Nagatomo | | |
| 5,445,022 A * | 8/1995 | Vassallo | .......................... | 73/426 |
| 5,845,777 A * | 12/1998 | Najmi | ........................ | 206/459.1 |
| 6,000,159 A * | 12/1999 | Hornung | .......................... | 40/307 |
| 6,647,741 B2 * | 11/2003 | Pechous et al. | .............. | 62/457.6 |
| 6,742,821 B2 * | 6/2004 | Kleinpell | ........................ | 294/176 |
| 6,805,072 B1 * | 10/2004 | DeSano | ........................ | 116/308 |
| 6,817,192 B2 * | 11/2004 | Ector et al. | ....................... | 62/125 |
| 7,167,419 B2 * | 1/2007 | Kwan et al. | .................... | 368/113 |
| 7,264,120 B2 * | 9/2007 | Turvey et al. | .................. | 206/542 |
| D612,488 S * | 3/2010 | Reay | ............................. | D24/116 |
| 7,742,360 B1 * | 6/2010 | Price | ............................... | 368/10 |
| 8,185,345 B2 * | 5/2012 | Mainini | ........................ | 702/173 |
| 2006/0087136 A1 * | 4/2006 | Pearl et al. | ...................... | 294/55 |
| 2006/0181961 A1 * | 8/2006 | Hobkirk | ......................... | 368/10 |
| 2008/0138477 A1 * | 6/2008 | Mular et al. | .................. | 426/392 |
| 2010/0192837 A1 * | 8/2010 | Leoni et al. | ................... | 116/307 |
| 2011/0056426 A1 * | 3/2011 | Fralick | ........................... | 116/308 |

FOREIGN PATENT DOCUMENTS

JP    2003125953 A * 5/2003

* cited by examiner

*Primary Examiner* — R. A. Smith
(74) *Attorney, Agent, or Firm* — Kelly & Kelley, LLP

(57) ABSTRACT

The animal feeding reminder includes a food handling apparatus which comprises a food scoop, a food bowl, or a food container for the transportation, selling, or purchasing of animal food. Date or time indicia are associated with the food handling apparatus. A marker is associated with the food handling apparatus and moveable relative to the indicia. The marker selectively identifies a distinct date or time from the date or time indicia. A marker positioning mechanism is associated with the marker, the apparatus, or both. The marker positioning mechanism securely holds the marker so as to identify the distinct date or time and prevent accidental or unintended movement of the marker to another date or time. Therefore, the marker can be selectively moved to identify the distinct date or time after each use of the food handling apparatus to remind a user of a last time an animal was fed.

8 Claims, 9 Drawing Sheets

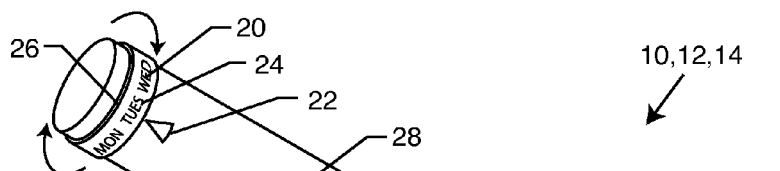
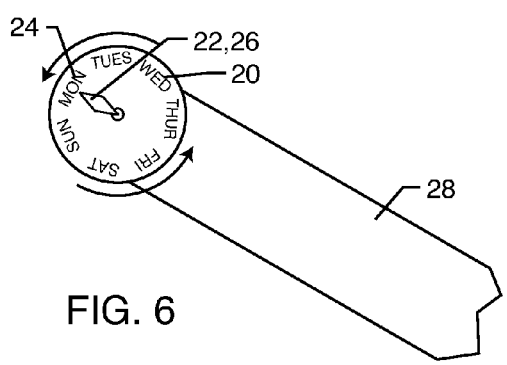
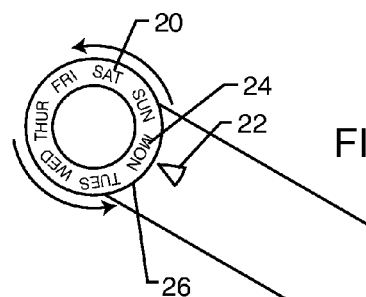
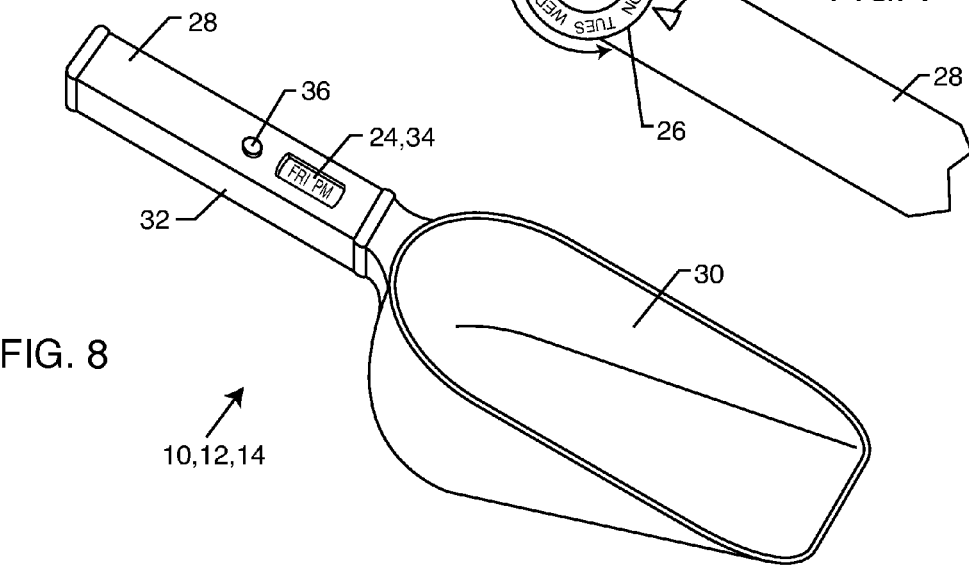

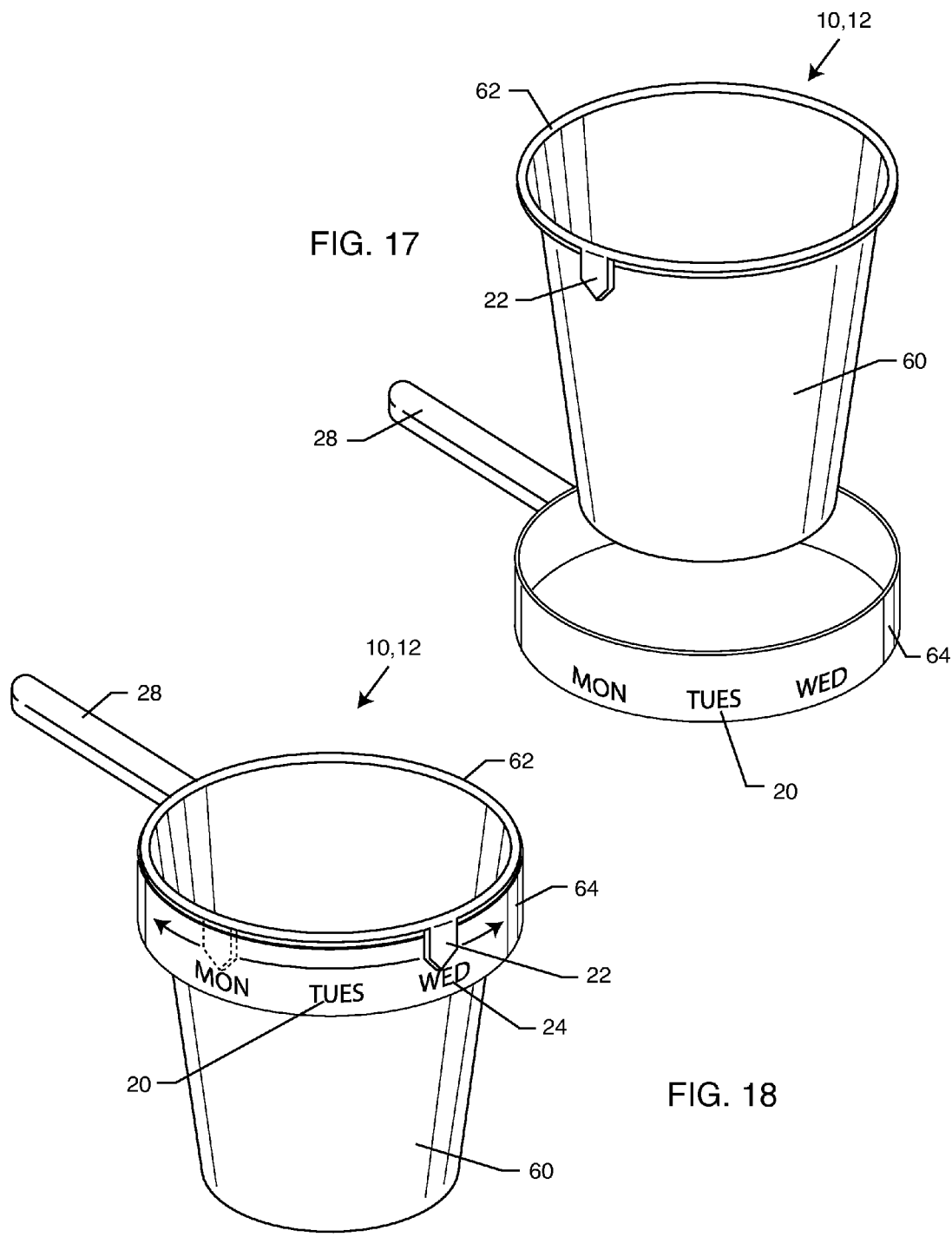

ANIMAL FEEDING REMINDER SYSTEM

FIELD OF THE INVENTION

The present invention generally relates to the feeding of animals. More particularly, the present invention relates to an animal feeder indicator which allows one to remember the last and next feeding.

BACKGROUND OF THE INVENTION

People today lead busy lives. A typical person has to learn to multi-task throughout the day to make sure all the everyday chores are accomplished. Not only does one have to go to their daily job, but one might also have to get one's children ready for school, drop the children off at school, work a full day, pick up groceries on the way home, cook and serve dinner, do the laundry, clean the house, bathe the children and put them to sleep, pay the bills, read or watch the news, respond to emails, and then finally go to bed.

In all of this chaos it is hard to remember even simple tasks which you may have already done. There are many times when one has left the house and wondered whether the iron was turned off or whether they shut the garage door. One of the simple tasks that is easily forgotten is whether the family pet was fed. One cannot simply ask the family pet whether they were fed today. Many pets will overeat if they have already been fed. Under-feeding or over-feeding a pet can lead to many problems, such as an inconsistent diet, under-nutrition, obesity, and also the stress and guilt of neglecting the proper care of one's pet.

Accordingly, there is a need for a simple and cost effective way to easily determine when the last time the pet was fed. The present invention fulfills these needs and provides other related advantages.

SUMMARY OF THE INVENTION

The animal feeding reminder system of the present invention includes a food handling apparatus. The food handling apparatus can further handle consumable products including medication. The food handing apparatus can comprise a food scoop, a food bowl, or a food container for the transportation, selling, or purchasing of animal food. A date or time indicia is associated with the food handling apparatus. A marker is associated with the food handling apparatus and moveable relative to the indicia. The marker selectively identifies a distinct date or time from the date or time indicia. A marker positioning mechanism is associated with the marker, the apparatus, or both. The marker positioning mechanism securely holds the marker so as to identify the distinct date or time and prevent accidental or unintended movement of the marker to another date or time. Therefore, the marker can be selectively moved to identify the distinct date or time after each use of the food handling apparatus to remind a user of a last time an animal was fed.

In an exemplary embodiment, the food scoop can comprise a handle attached to a scoop. The date or time indicia can be disposed along a length or about a circumference of the food handling apparatus. The marker can be slidable relative to the date or time indicia. Alternatively, the marker can be rotatable relative to the date or time indicia.

In another exemplary embodiment, the food container can comprise a first portion rotatable relative to a second portion. One of the portions can include the date or time indicia and the other portion can include the marker. Accordingly, the marker identifies the distinct date or time from the date or time indicia.

In yet another exemplary embodiment the marker can comprise a clip.

In yet another exemplary embodiment the food handling apparatus can include an electronic processor and an electronic readout for displaying the distinct date or time.

The animal feeding reminder system includes the step of utilizing the food handling apparatus to identify the distinct date or time of a current feeding of the animal. Accordingly, this includes the step of selectively moving the marker to identify the distinct date or time of the current feeding. Remembering the last time the animal was fed can be ascertained simply by reading the marker and its correspondingly marked time or date.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 5 is a perspective view of another exemplary food scoop embodying the present invention;

FIG. 6 is a partial top view of another exemplary food scoop embodying the present invention;

FIG. 7 is a partial top view of another exemplary food scoop embodying the present invention;

FIG. 8 is a perspective view of another exemplary food scoop embodying the present invention;

FIG. 17 is a perspective exploded view of another exemplary food container embodying the present invention;

FIG. 18 is a perspective view of the structure of FIG. 17 now assembled;

DETAILED DESCRIPTION OF THE PREFERRED EMBODIMENTS

Figure 1:
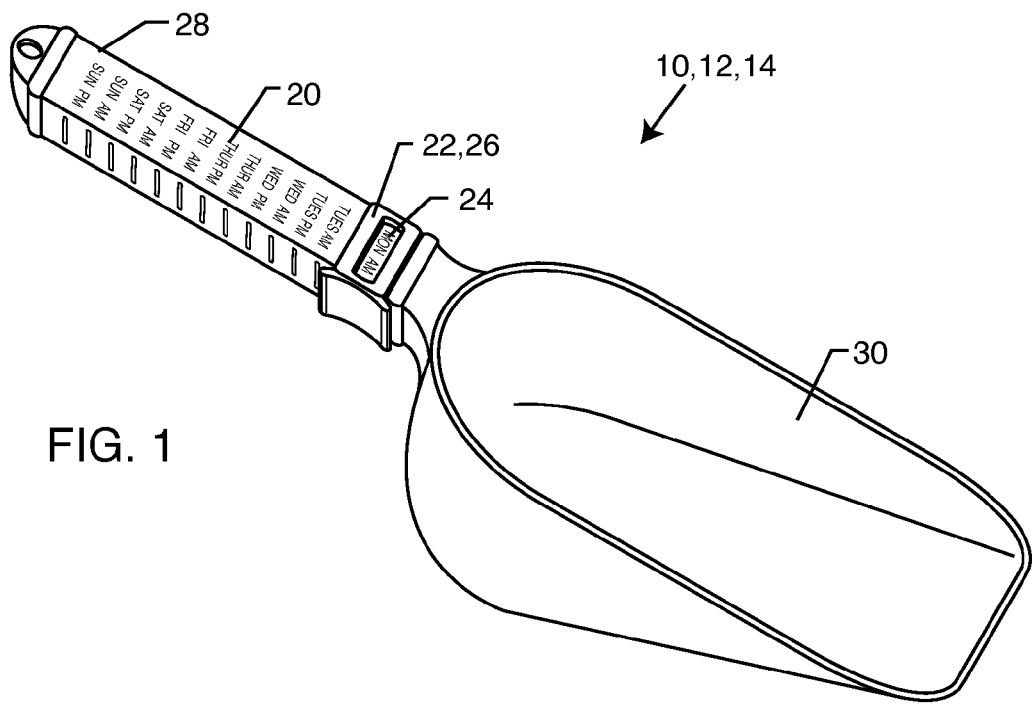
FIG. 1 is a perspective view of an exemplary food scoop embodying the present invention.
Figure 2:
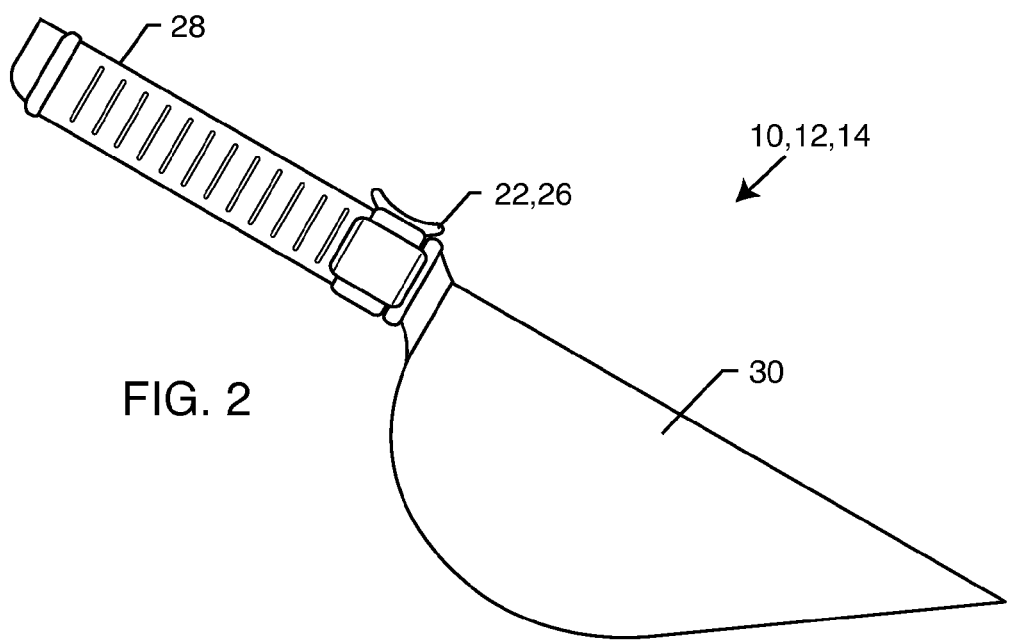
FIG. 2 is a side view of the embodiment of FIG. 1.
Figures 3, 4:
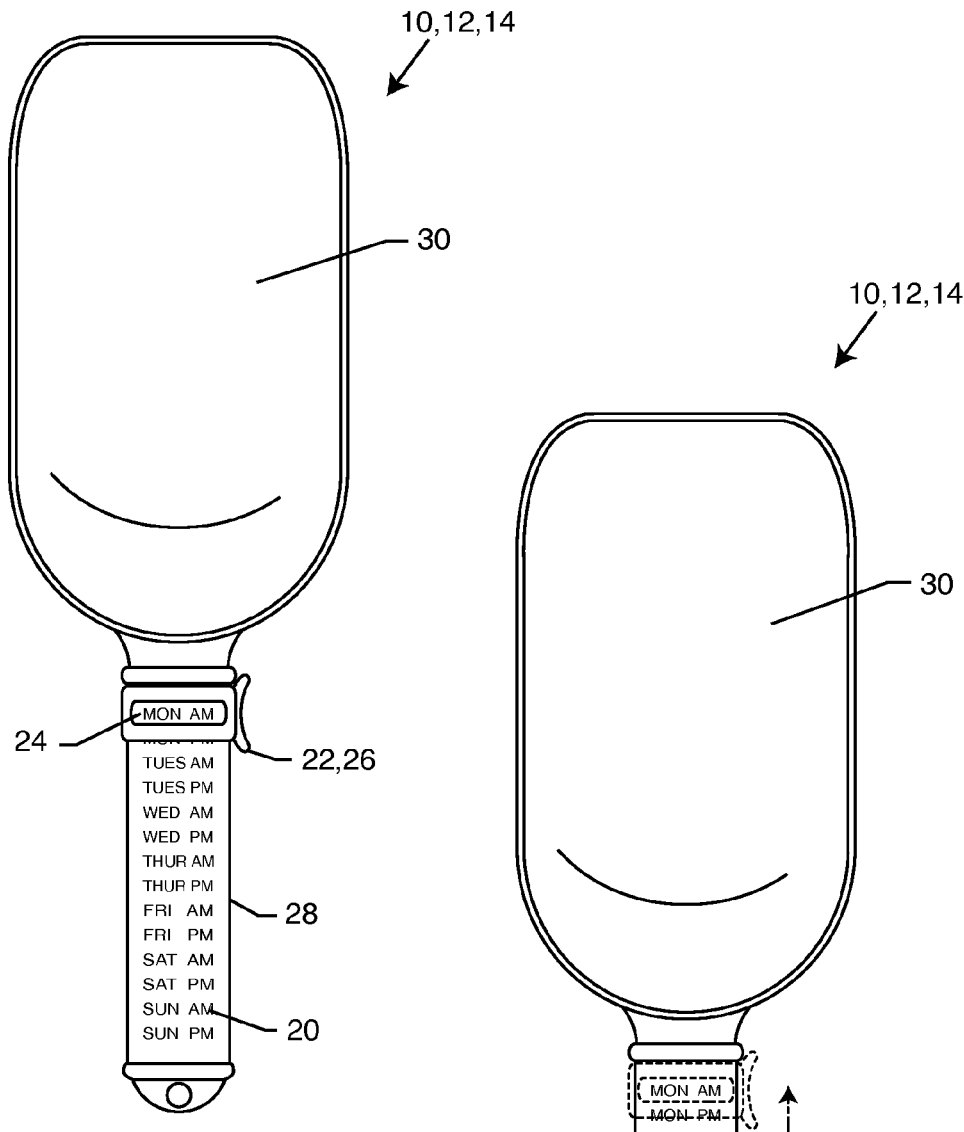
FIG. 3 is a top view of the embodiment of FIG. 1.
FIG. 4 is another top view of the embodiment of FIG. 1 showing the marker moved.

As shown in the drawings for purposes of illustration, the present invention for an animal feeding reminder system is referred to generally by the reference number 10. The animal feeding reminder system 10 of the present invention includes a food handling apparatus 12. The food handing apparatus 12 can comprise a food scoop 14, a food bowl 16, or a food container 18 for the transportation, selling, or purchasing of animal food. It is to be understood by those skilled in the art that the food handling apparatus 12 can further handle consumable products including medication. Alternatively, the food handling apparatus 12 can handle a combination mixture of food and medication.

A date or time indicia 20 is associated with the food handling apparatus 12. The date or time indicia 20 can comprise a multitude of information. For instance, the information can be days of the week, days of the month, or months of the year. The date and time indicia can include specific times of the day or simply an a.m. or p.m. moniker. The intervals of time displayed depend on the specific pet or animal the food apparatus is associated with. For instance, dogs may be fed twice a day and therefore have two indicia per each day of the week. Alternatively, a lizard may be fed only once a week and accordingly its indicia include the 52 weeks in the year. As can be seen by one skilled in the art, a multitude of actual dates and times can be utilized and this specification is not intended to limit it to the precise form described herein.

A marker 22 is associated with the food handling apparatus 12 and moveable relative to the indicia 20. The marker 22 selectively identifies a distinct date or time 24 from the date or time indicia. In some embodiments the marker 22 moves relative to the food handing apparatus 12. In other embodiments the marker 22 remains stationary while the date or time indicia move relative to the marker 22 and food handling apparatus 12.

A marker positioning mechanism 26 is associated with the marker 22, the apparatus 12, or both. The marker positioning mechanism 26 securely holds the marker 22 so as to identify the distinct date or time 24 and prevent accidental or unintended movement of the marker 22 to another date or time. Therefore, the marker 22 can be selectively moved to identify the distinct date or time 24 after each use of the food handling apparatus 12 to remind a user of a last time an animal was fed.

The marker positioning mechanism 26 can be a multitude of designs. A frictional bias or frictional snap point may be designed into the various structures of the apparatus 12, the marker 22, or other various portions such that the marker 22 is frictionally held in place relative to the date or time indicia 20. The frictional bias is low enough that a user can manually move the marker 22 to indicate a new date or time, yet the marker 22 will remain sufficiently in place such that it doesn't easily get accidentally moved. The frictional bias can be accomplished with springs, connectors, snap fits, interference fits, magnets, puncture holes, or any other suitable method known today. As can be seen by one skilled in the art, there are a multitude of possible designs and this specification is not intended to limit it to the precise forms described herein.

FIGS. 1-4 are views of an exemplary food scoop 12 embodying the present invention. The food scoop 12 can comprise a handle 28 attached to a scoop 30. The date or time indicia 20 can be disposed along a length or about a circumference of the food handling apparatus 12, or in this case the handle 28. The marker 22 can be slidable relative to the date or time indicia 20. Alternatively, the marker 22 can be rotatable relative to the date or time indicia 20 as shown in FIGS. 5-7. FIG. 5 shows the marker 22 rotating around the circumference of the handle 28. FIG. 6 shows the date and time indicia 20 circularly disposed at the end of the handle 28 where now the marker 22 rotates like a clock. FIG. 7 shows the marker 22 formed as an integral part of the handle 28 where now the date and time indicia 20 rotate about the end of the handle 28.

In yet another exemplary embodiment as shown in FIG. 8, the food handling apparatus 12 can include an electronic processor 32 and an electronic readout 34 for displaying the distinct date or time 24. This embodiment uses an internal battery, whether rechargeable or replaceable. A button 36, or a plurality of buttons 36, can be used to control the electronic readout 34 such that it correctly displays the distinct date or time 24.

Figure 9:
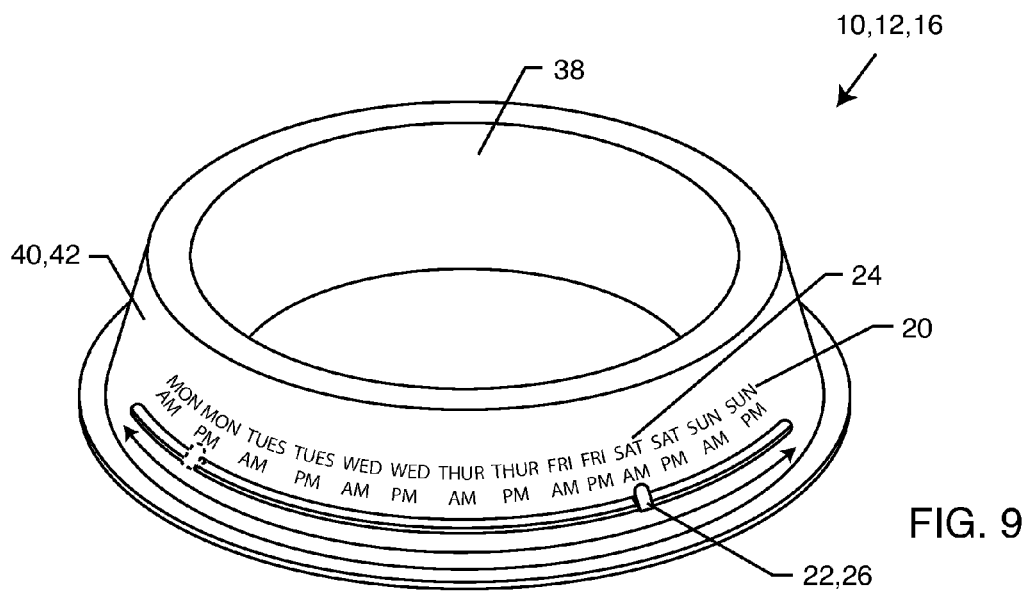
FIG. 9 is a perspective view of an exemplary food bowl embodying the present invention.

FIGS. 9-13 are various embodiments of an exemplary food bowl 16. FIG. 9 is a perspective view of an exemplary food bowl 14 where the food bowl 14 comprises a bowl portion 38 and a base portion 40. The base 40 has the date or time indicia 20 disposed along its outside circumferential surface 42. The marker 22 and marker positioning mechanism 26 are slidable relative to the base 40. The marker 22 can be moved to identify the distinct date or time 24.

Figure 10:
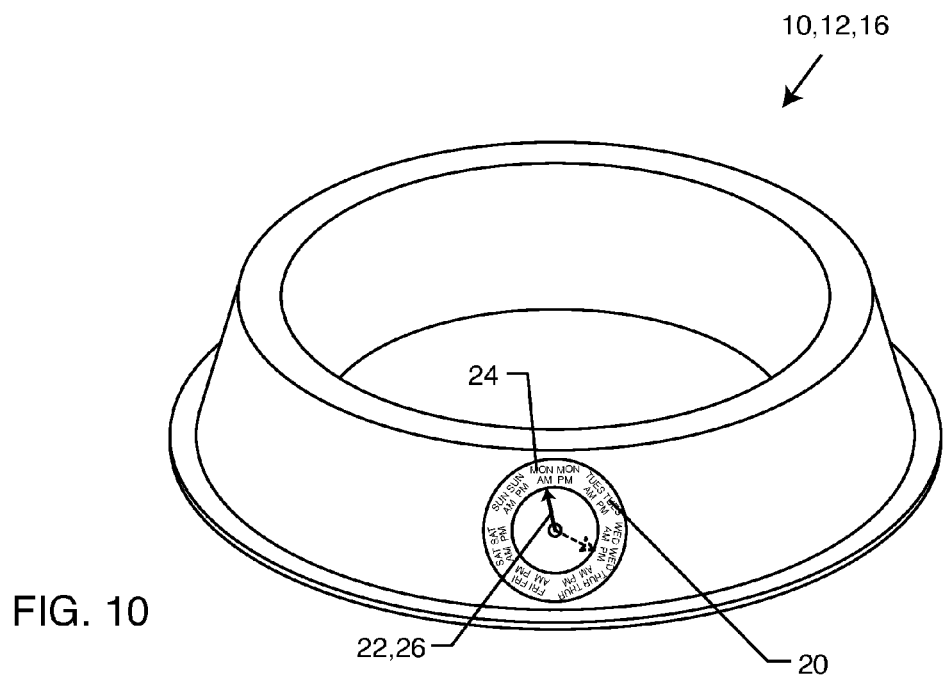
FIG. 10 is a perspective view of another exemplary food bowl embodying the present invention.

FIG. 10 is a perspective view of another exemplary food bowl 14 where the date or time indicia 20 is disposed in a circular fashion similar to a clock. The marker 22 then is rotatable like the hand of a clock such that it then can identify the distinct date or time 24.

Figure 11:
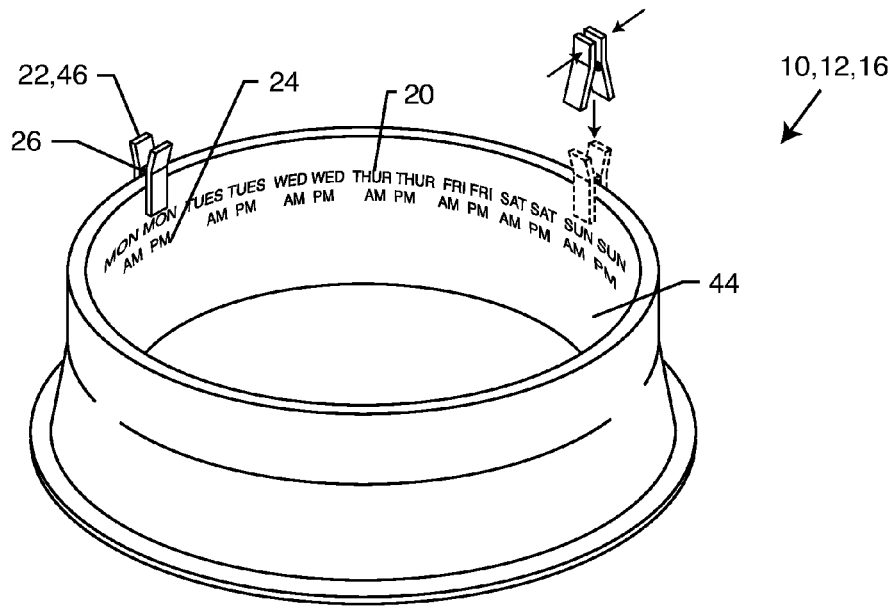
FIG. 11 is a perspective view of another exemplary food bowl embodying the present invention.

FIG. 11 is a perspective view of another exemplary food bowl 14 where the date or time indicia 20 is disposed on an inside circumferential surface 44 of the bowl 16. A removable and positionable marker 22/clip 46 then can identify the distinct date or time 24.

Figure 12:
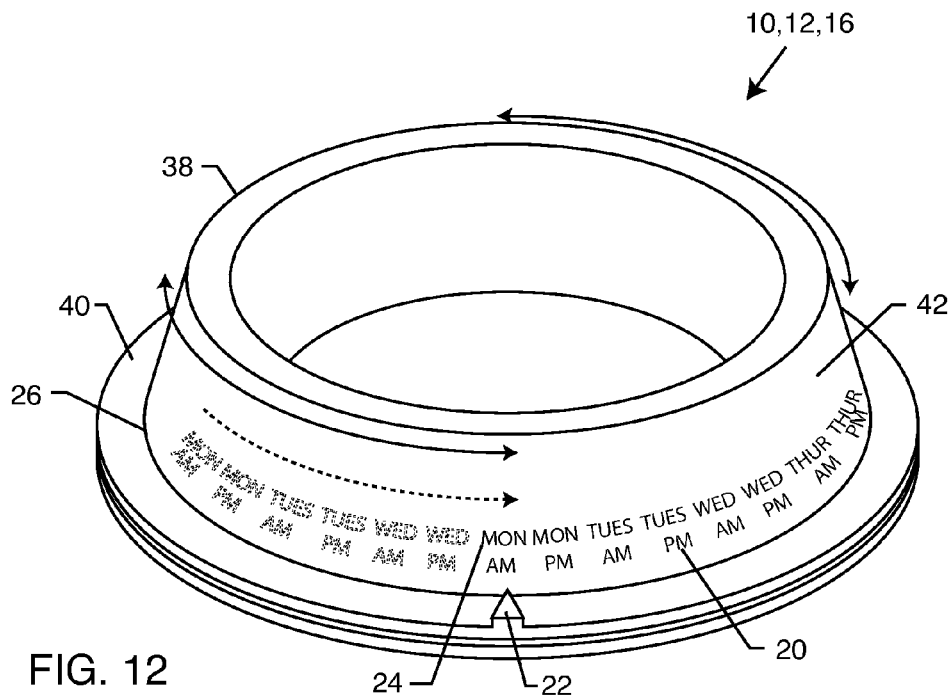
FIG. 12 is a perspective view of another exemplary food bowl embodying the present invention.

FIG. 12 is a perspective view of another exemplary food bowl 14 where the bowl portion 38 rotates relative to the base portion 40. The marker 22 is formed as part of the base 40. The date or time indicia 20 is disposed on the outside circumferential surface 42 of the bowl 38.

Figure 13:
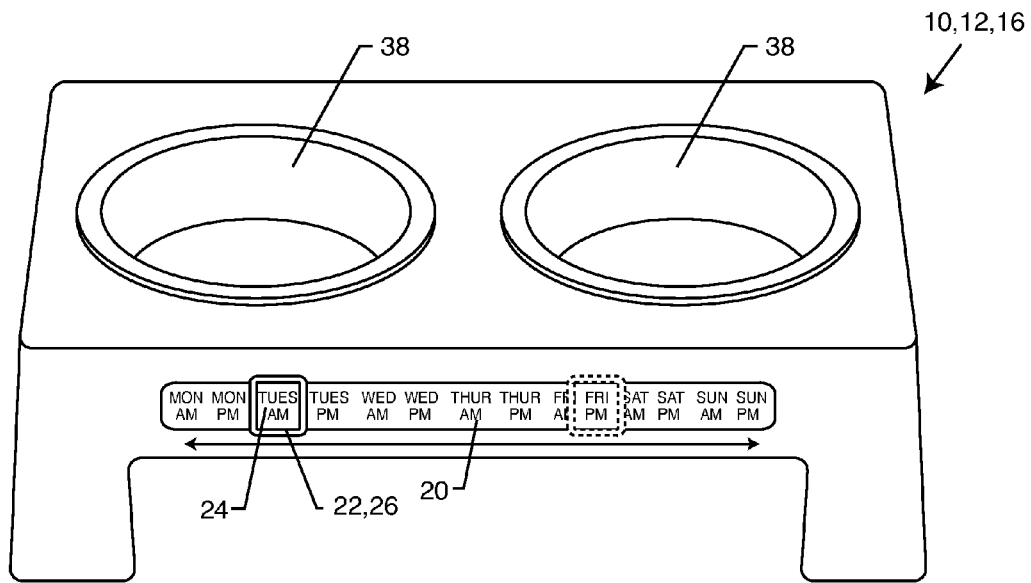
FIG. 13 is a perspective view of another exemplary food bowl embodying the present invention.

FIG. 13 is a perspective view of another exemplary food bowl 14 where now there are two bowls 38. The marker 22 is slidable along a base portion 40 and identifies a distinct date or time 24 from the date or time indicia 20.

Figure 14:
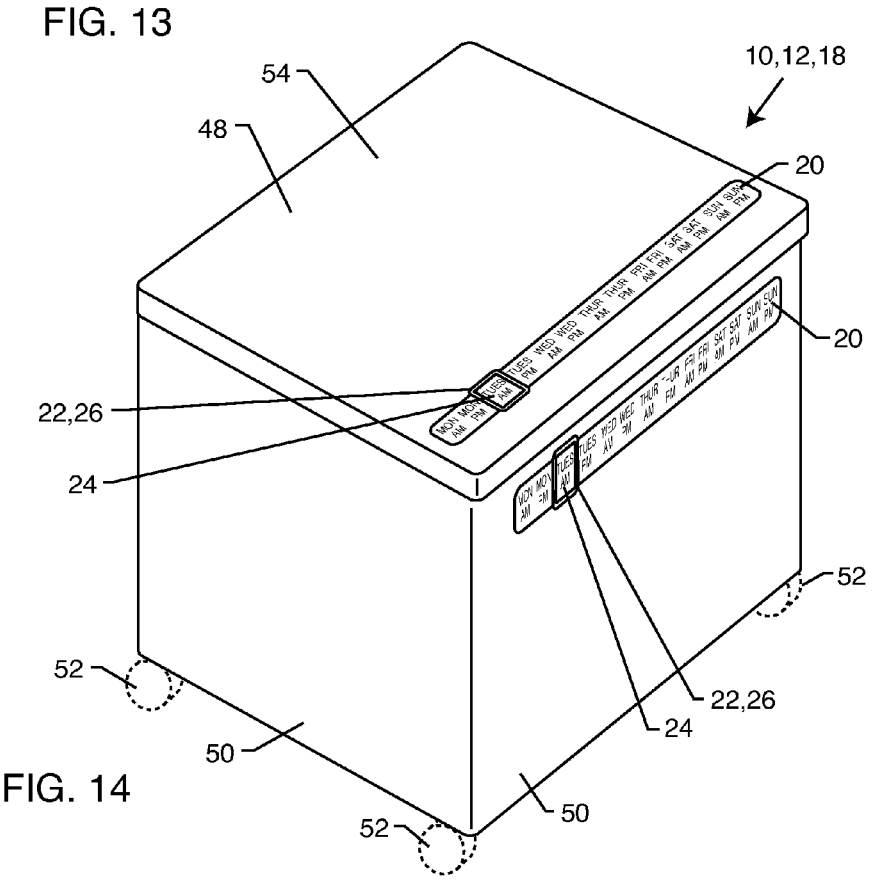
FIG. 14 is a perspective view of an exemplary food container embodying the present invention.
Figure 15:
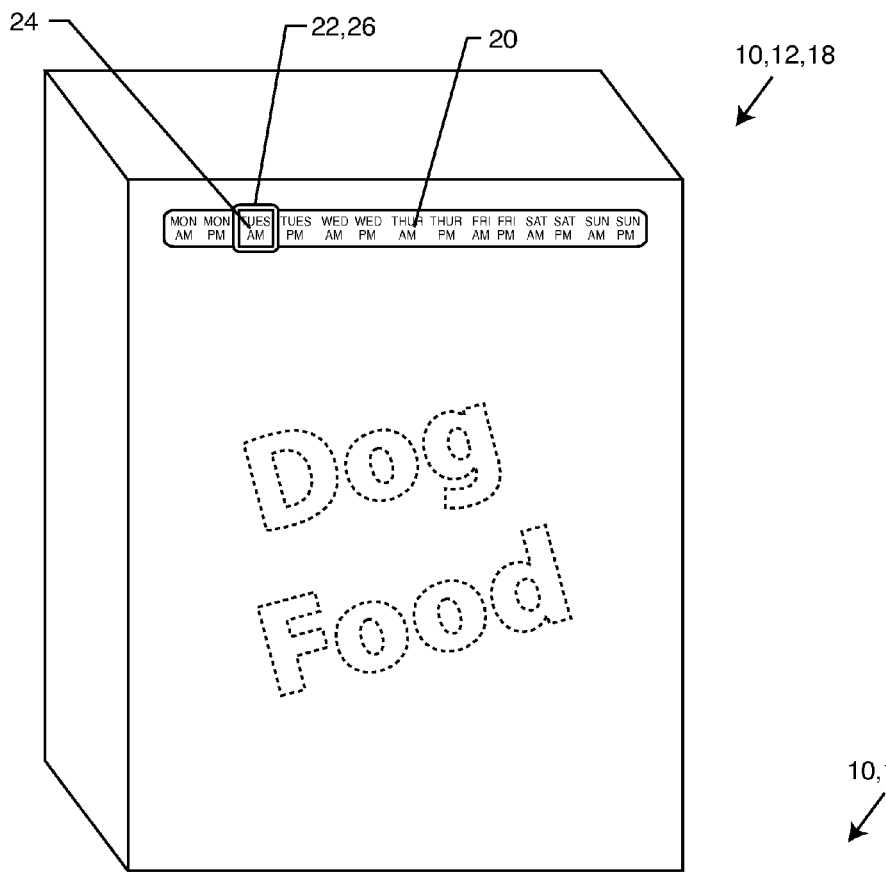
FIG. 15 is a perspective view of another exemplary food container embodying the present invention.
Figure 16:
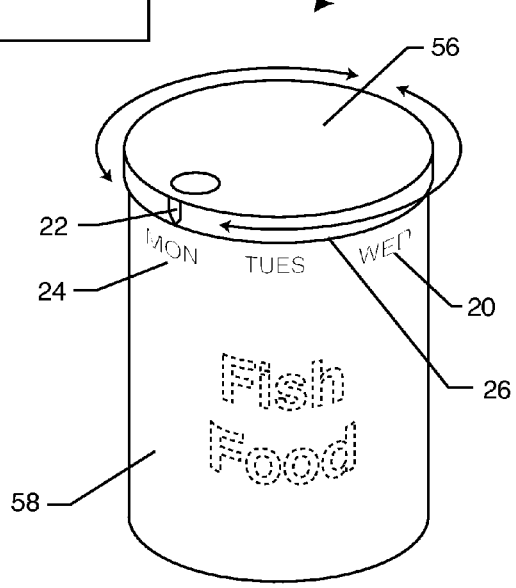
FIG. 16 is a perspective view of another exemplary food container embodying the present invention.

FIGS. 14-16 are exemplary embodiment of food containers 18. FIG. 14 is a perspective view of an exemplary food container 18 where the marker 22 can be slidable along a top surface 48 or a side surface 50. The food container 18 can be shaped in a multitude of sizes and shapes and include wheels 52 at the bottom for ease of moving. In this embodiment the food container 18 includes a lid 54 that is pivotable such that access is allowed to the inside. FIG. 15 is a perspective view of another exemplary food container 18 embodying the present invention.

FIG. 16 is a perspective view of another exemplary food container 18, where the food container 18 can comprise a first portion 56 rotatable relative to a second portion 58. One of the portions (56 or 58) can include the date or time indicia 20 and the other portion (56 or 58) can include the marker 22. Accordingly, the marker 22 identifies the distinct date or time 24 from the date or time indicia 20.

As can be seen, the animal feeding reminder system 10 includes the step of utilizing the food handling apparatus 12 to identify the distinct date or time 24 of a current feeding of the animal. Accordingly, this includes the step of selectively moving the marker 22 to identify the distinct date or time 24 of the current feeding. Remembering the last time the animal was fed can be ascertained simply by reading the marker 22 and the correspondingly marked distinct time or date 24.

FIG. 17 is a perspective exploded view of another exemplary food handling apparatus 12 embodying the present invention now in the form of a bucket 60. FIG. 18 is a perspective view of the structure of FIG. 17 where the handle 28 is now assembled and fits underneath the rim 62 of the bucket 60. The marker 22 is formed as part of the rim 62 of the bucket 60. The handle 28 is rotatable relative to the bucket 60 and marker 22. The handle 28 is connected to a ring portion 64 which captures the rim 62 of the bucket 60. The ring 64 includes the date or time indicia 20 to which the marker 22 can identify a distinct date or time 24. It is understood that a frictional fit exists between the bucket 60 and the ring 64 such that the ring 64 remains in place once it is positioned. As can be understood by one skilled the art, the bucket 60 could include the date or time indicia 20 and the ring portion 64 of the handle 28 include the marker 22.

Figure 19:
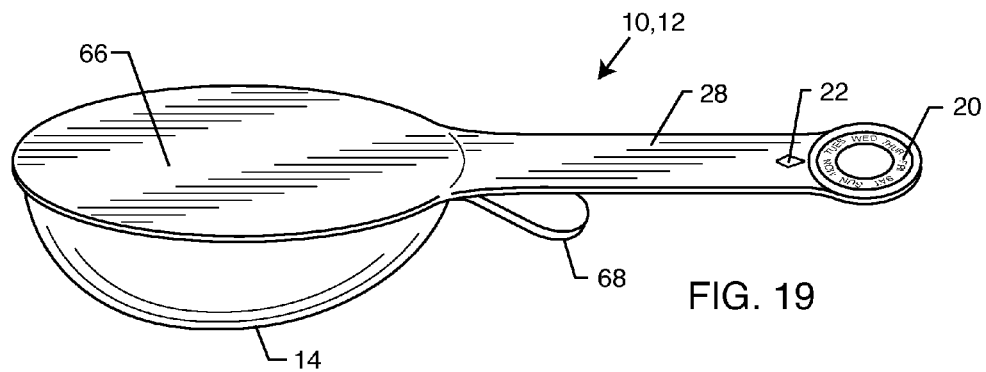
FIG. 19 is a perspective view of another exemplary food container embodying the present invention.

FIG. 19 is a perspective view of another exemplary food handling apparatus 12. In this embodiment the food scoop 14 is pivotably attached to the handle 28. The handle 28 extends over the food scoop 14 such that it forms a cover 66. The cover 66 acts as a lid to hold the contents of the food scoop 14 within. The food scoop 14 can be biased through a spring or other means known in the art to bias it in the closed position such that it closes with the cover 66. FIG. 19 shows the food scoop 14 and the cover 66 in the closed position.

Figure 20:
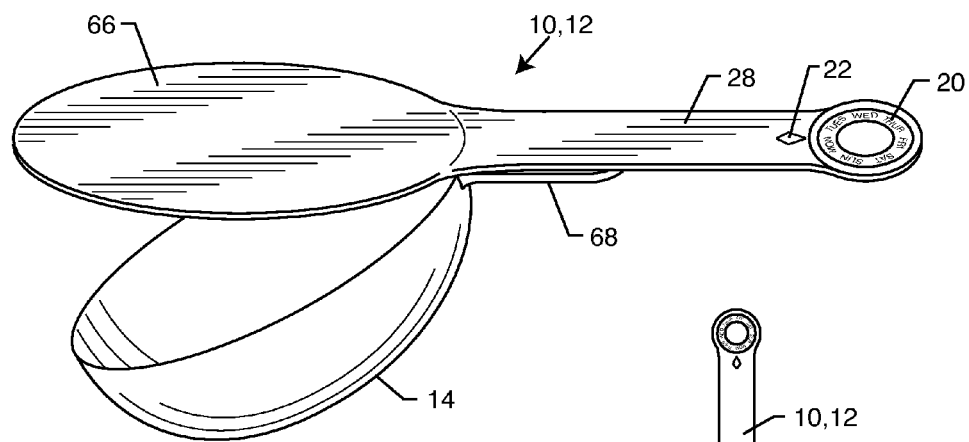
FIG. 20 is a view similar to FIG. 19 now with the scoop opened through a hand actuated lever.

A lever 68 is formed as part of the food scoop 14. The lever 68 can be actuated by the user when the handle 28 is grasped overcoming the internal bias. The lever 68 is accessible to the user's fingers and can be squeezed. When the lever 68 is squeezed, it opens the food scoop 14 relative to the cover 66. FIG. 20 is a view similar to FIG. 19 now with the food scoop 14 opened through the hand actuated lever 68.

Figure 21:
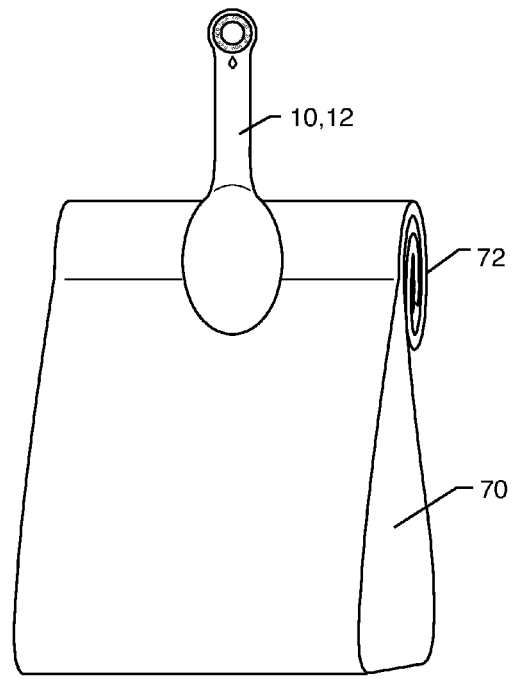
FIG. 21 is a perspective view of the embodiment of FIG. 19 now showing the food container clipped to a bag.

This embodiment not only keeps the contents of the food scoop 14 secure, it can be used to hold a bag 70 closed. FIG. 21 is a perspective view of the embodiment of FIG. 19 now showing the food handling apparatus 12 clipped to the bag 70. Many types of animal feed or medication are purchased within a bag-like container. The bag 70 is generally opened at the top and can then be rolled up for closure creating a rolled up portion 72. However, most rolled up bags tend to unravel and open unless they are securely held closed. Typically either tape or a removable clip is used to hold the bag 70 shut. The food handling apparatus 12 can now be used to hold the bag 70 securely closed. The lever 68 can be actuated by the user opening the food scoop 14 relative to the cover 66. Then this opening can be inserted over top of the rolled up portion 72. When the lever 68 is released, the bias of the spring or other mechanical means keeps the rolled up portion 72 securely closed. It is to be understood by those skilled in the art that the embodiments shown in FIGS. 19-21 can be used with any of the marker positioning mechanisms 26 shown and described throughout this specification, and is to not be limited to the precise form shown herein.

Although several embodiments have been described in detail for purposes of illustration, various modifications may be made to each without departing from the scope and spirit of the invention. Accordingly, the invention is not to be limited, except as by the appended claims.

What is claimed is:

1. An animal feeding reminder system, comprising:
   a food handling apparatus;
   date or time indicia associated with the apparatus;
   a marker associated with the apparatus and moveable relative to the indicia, wherein the marker selectively identifies a distinct date or time from the date or time indicia; and
   a marker positioning mechanism associated with the marker, the apparatus, or both, for securely holding the marker so as to identify the distinct date or time and prevent accidental or unintended movement of the marker to another date or time;
   wherein the marker is selectively moved to identify the distinct date or time after each use of the food handling apparatus to remind a user of a last time an animal was fed;
   wherein the food handling apparatus comprises a food scoop for the transportation, selling, purchasing, or feeding of animal food; and
   wherein the food scoop comprises a handle attached to a scoop, wherein the scoop is pivotable relative to the handle, and wherein the handle comprises a cover disposed about the spoop cooperating to form a closed position.

2. The system of claim 1, wherein the date or time indicia is disposed along a length or about a circumference of the food handling apparatus.

3. The system of claim 2, wherein the marker is rotatable relative to the date or time indicia.

4. The system of claim 3, wherein the food handling apparatus comprises a first portion rotatable relative to a second portion, where one of the portions includes the date or time indicia and the other portion includes the marker, such that the marker identifies the distinct date or time from the date or time indicia.

5. The system of claim 1, including the step of utilizing the food handling apparatus to identity the distinct date or time of a current feeding of the animal.

6. The system of claim 5, including the step of selectively moving the marker to identify the distinct date or time of the current feeding.

7. The system of claim 1, wherein the scoop further comprises a lever and is biased in the closed position.

8. The system of claim 1, wherein the time or date indicia is disposed along a length of the handle.

* * * * *